United States Patent
Pani et al.

(10) Patent No.: US 8,942,085 B1
(45) Date of Patent: Jan. 27, 2015

(54) SYSTEM AND METHOD FOR ROUTING AROUND FAILED LINKS

(75) Inventors: Ayaskant Pani, Fremont, CA (US); Arjun Singh, Fremont, CA (US)

(73) Assignee: Google Inc., Mountain View, CA (US)

( * ) Notice: Subject to any disclaimer, the term of this patent is extended or adjusted under 35 U.S.C. 154(b) by 294 days.

(21) Appl. No.: 13/478,707

(22) Filed: May 23, 2012

(51) Int. Cl.
*H04L 12/26* (2006.01)
*H04L 12/703* (2013.01)

(52) U.S. Cl.
CPC .................................... *H04L 45/28* (2013.01)
USPC .......................................................... 370/225

(58) Field of Classification Search
USPC ................................................. 370/216–228
See application file for complete search history.

(56) References Cited

U.S. PATENT DOCUMENTS

| | | | | |
|---|---|---|---|---|
| 6,167,025 A * | 12/2000 | Hsing et al. | ................... | 370/216 |
| 6,222,820 B1 * | 4/2001 | Hamami | ........................ | 370/218 |
| 7,133,358 B2 * | 11/2006 | Kano | ............................ | 370/221 |
| 7,817,542 B2 * | 10/2010 | Xiong et al. | .................. | 370/228 |

OTHER PUBLICATIONS

B. Hedlund, "On data center scale, OpenFlow, and SDN", Apr. 21, 2011.
N. McKeown et al., "OpenFlow: Enabling Innovation in Campus Networks", Mar. 14, 2008.

* cited by examiner

*Primary Examiner* — Kwang B Yao
*Assistant Examiner* — Juvena Loo
(74) *Attorney, Agent, or Firm* — Lerner, David, Littenberg, Krumholz & Mentlik, LLP

(57) ABSTRACT

A multi-stage network may include a first stage having a first plurality of switches, a second stage having a second plurality of switches, and a number of links between the first and second stages. A controller in communication with the first plurality of switches and the second plurality of switches may determine a priority path to be utilized by each switch in sending information and a fallback path. If the priority path includes a failed link, the controller implements in one or more of the switches the fallback path for sending the information. The fallback path may, for example, cause the information to be transmitted through a peer router.

16 Claims, 5 Drawing Sheets

| Match Criteria/Key: Destination IP address | Action | Priority |
|---|---|---|
| IP Address of hosts connected to switch 111 | Modify Layer-2 header of packet and forward it via a port towards switch 111 | 1 |
| IP Address of hosts connected to switch 111 | Encapsulate packet in a tunnel header with outer header source = switch 124 IP address and dest addr = switch 126's IP Address. Apply normal forwarding to route the outer packet. | 2 |
| | | |
| | | |

Fig. 3

SYSTEM AND METHOD FOR ROUTING AROUND FAILED LINKS

BACKGROUND OF THE INVENTION

In some networks, such as software defined networks or OpenFlow™ networks, control plane tasks are cleanly separated from data plane tasks. For example, forwarding entities, such as routers or switches, only perform the data plane tasks, such as forwarding packets between various ports after applying modification to the packet's encapsulation such as modifying a header. A separate control server may perform the control plane tasks, such as learning about media access control (MAC) address, participating in routing algorithms, learning about various routes, performing various neighbor discovery related tasks and gleaning about address mapping etc. The forwarding entities talk to the controller using a protocol specified by OpenFlow™ specification. When control plane tasks, such as routing, running on the OpenFlow™ controller determine a route about various prefixes, the controller will translate the route to a flow and push these flows to the forwarding devices. The forwarding devices only run OpenFlow™ protocol in an "agent" like role and listen for flow-updates from the controller. Upon receiving a flow, the forwarding devices typically program their data plane, which performs packet forwarding. Also the controller receives port status information and thereby has an updated view of the network topology.

In any multi-stage network, a link may fail. The failure must propagate through the network so that routing algorithms can converge on the new state of network and alternate routes can be derived for traffic destined for hosts or switches affected by the link failure. In an OpenFlow™ network, convergence latency is increased because of (1) latency of reporting the link failure from the switch that detects failure to the controller, (2) the controller manipulating the new routing topology, and (3) the controller distributing the new routing information to all affected switched in the form of OpenFlow™ flows. Depending on the network load, topology, and switches, this latency can be several seconds long. During this extended convergence period, all packets routed along the route having the failed link are dropped. Because such networks may operate at speeds of 10-100 Gbps, such packet loss during this period can amount to hundreds of lost packets.

SUMMARY OF THE INVENTION

To prevent packet loss during the convergence period, packets may be rerouted along an alternate route as opposed to being dropped. For example, a switch having a failed link between it and a packet's next hop may return the packet to a higher tier switch for transmission back down to the packet's destination through a peer switch.

One aspect of the disclosure provides . . . [to be completed when claims are finalized].

BRIEF DESCRIPTION OF THE DRAWINGS

FIG. 3 is an example of a flow table according to aspects of the disclosure.

DETAILED DESCRIPTION

Figure 1:
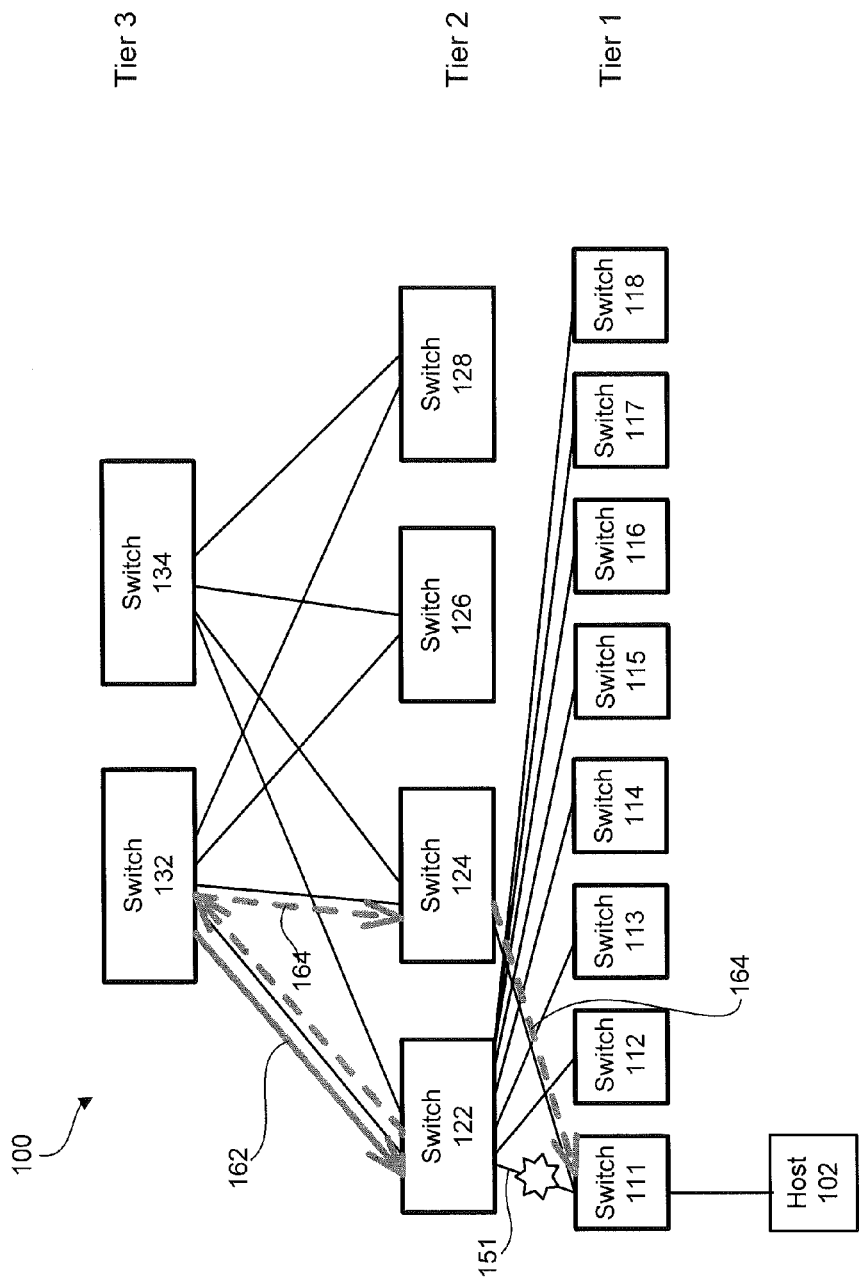
FIG. 1 is a schematic diagram of a multi-stage network according to aspects of the disclosure.

FIG. 1 illustrates a multi-stage network 100, including a first stage (Tier 1) having a first plurality of switches 111-118, a second stage (Tier 2) having a second plurality of switches 122, 124, 126, 128, and a third stage (Tier 3) having switches 132, 134. While a three stage network is shown, it should be understood that any number of stages may be used. Each of the Tier 1 switches 111-118 may be coupled to host devices, such as host device 102. The host devices may be, for example, network servers or other computing devices. Each Tier 1 switch 111-118 may further be coupled to one or more of the Tier 2 switches 122-128. For example, each Tier 1 switch 111-118 may be coupled to each Tier 2 switch 122-128. Similarly, each Tier 2 switch 122-128 may be coupled to all or fewer Tier 3 switches 132-134.

In this example, a link 151 between the switch 122 and the switch 111 is down. Thus, while a path 162 may be predetermined as a priority path from the switch 132 to the switch 111, for example, because it is the most efficient path or because of a packet's characteristics in Equal Cost Multi-path (ECMP) routing, packets transmitted to the switch 122 for further transmission to the switch 111 may be dropped. To prevent packet loss, such packets may be backtracked and transmitted to the switch 111 using fallback path 164. For example, the packets may be backtracked from the switch 122 up to a higher tier switch, such as the Tier 3 switch 132, for delivery to the Tier 1 switch 111 through another path, such as through the peer Tier 2 switch 124.

While only a few switches 111-118, 122-128, 132-134 are shown, it should be understood that the network 100 may be expanded to include any number of switches, for example, to accommodate greater amounts of network traffic. The switches 111-118, 122-128, 132-134 may be routers, chips, spines, or any other type of device capable of receiving and transmitting the packets. According to one example, the switches 111-118, 122-128, 132-134 may operate under the control of a controller, such as in an OpenFlow™ network.

Figure 2:
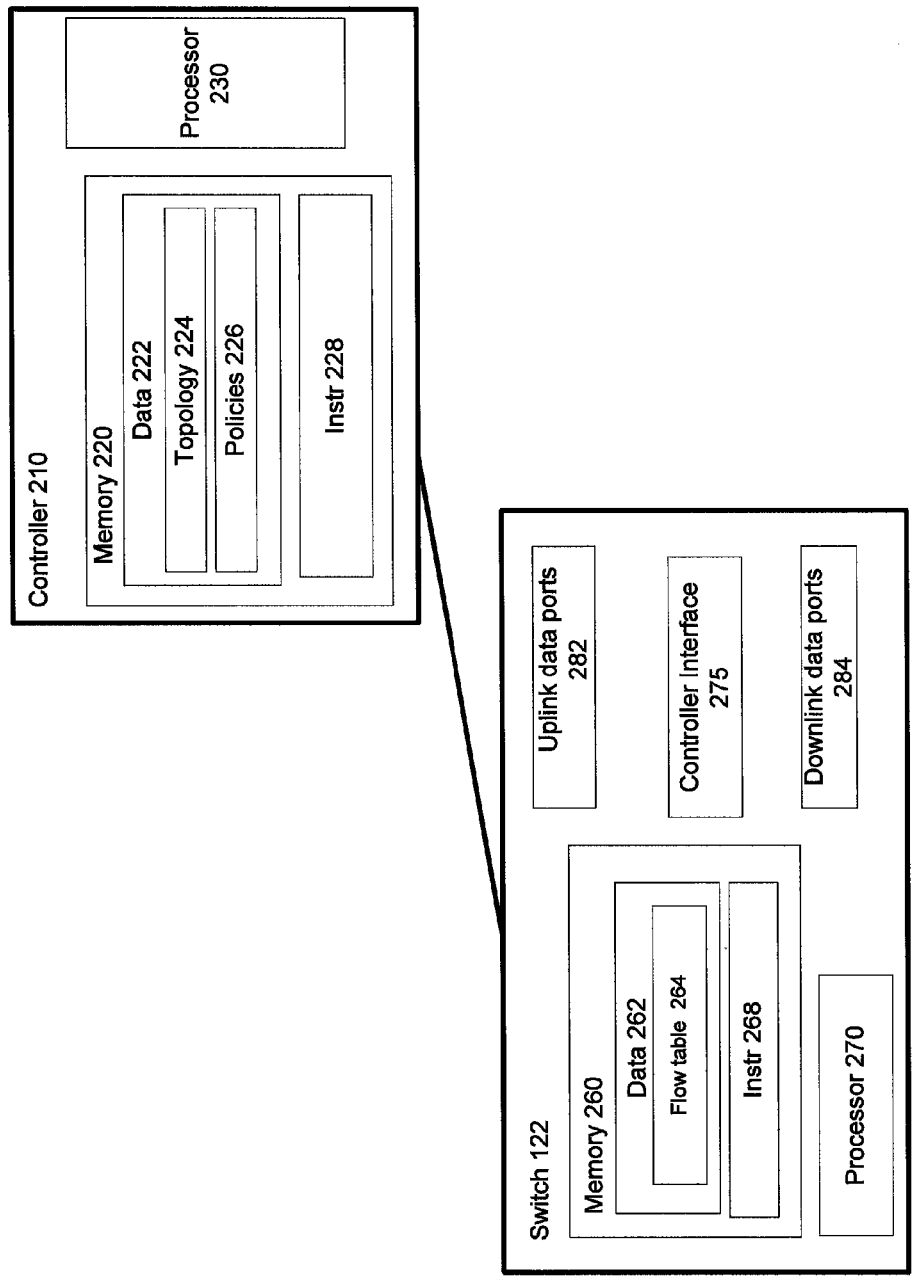
FIG. 2 is a block diagram of a switch in communication with a controller according to aspects of the disclosure.

FIG. 2 illustrates an example of a switch, such as the switch 122, in communication with a controller 210. The controller 210 may be any type of computing device capable of transmitting instructions to a switch, for example, using a given protocol. While the example of FIG. 2 illustrates the controller 210 in association with one switch 122, the controller 210 may communicate with and control any number of switches in a given network at a given time. The controller 210 may comprise a memory 220, including data 222 and instructions 228, and a processor 230 coupled to the memory 220.

The memory 220 stores information accessible by processor 230, including instructions 228, and data 222 that may be executed or otherwise used by the processor 230. The memory 220 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 228 may be any set of instructions to be executed directly (such as machine code) or indirectly (such as scripts) by the processor 230. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 222 may include information used to control the routing of packets or other traffic by the switch 122. For example, the data 222 may include topology information 224 and policy information 226. The topology information 224 may include information regarding a configuration of the switches in the network. For example, this information may indicate how many switches are in the network, how many tiers those switches are arranged in, and which switches are connected to which other switches. Such information may be useful in determining which routes should be used for routing flows through the network.

The policy information 226 may include information regarding priority of flows, route preferences, or the like. For example, flows destined for a given host may take any number of paths between an upper tier switch and the host. A most direct path may be assigned a highest priority, so that the flows destined for the given host most often are sent along that path. Alternate paths may be assigned a lower priority, such that the alternate paths are taken only in particular circumstances, such as if a link between two switches in the highest priority path is down.

The data 222 may be retrieved, stored or modified by processor 230 in accordance with the instructions 228. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 230 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The switch 122 may also comprise a memory 260, including data 262 and instructions 268, and a processor 270 coupled to the memory 260. The switch 122 may also include a controller interface 275, for communicating with the controller 210. Further, the switch 122 may include a number of data ports, such as uplink data ports 282 and downlink data ports 284.

Similar to the memory 220 of the controller 210, the memory 260 stores information accessible by processor 270, including instructions 268, and data 262 that may be executed or otherwise used by the processor 270. The memory 260 may be of any type capable of storing information accessible by the processor, and the instructions 268 may be any set of instructions to be executed directly or indirectly by the processor 270. The data 262 may be retrieved, stored or modified by processor 270 in accordance with the instructions 268.

The data 262 may include one or more flow tables 264. For example, the flow tables 264 may include a number of entries, each listing a key and an action, with priorities for different actions associated with the same key being determined by the controller 210. As packets are received by the switch 122, header information in those packets may be matched against the keys of the flow table to determine a corresponding action, such as a next hop. The entries in the flow table may be used directly or indirectly to forward packets. In a software based switch, the flow table can be accessed directly by a forwarding software module to alter the packet's header information and to forward the packet to an appropriate port. Alternatively, the processor 230 may program hardware modules based on the flow table entries, and these hardware modules can take responsibility of properly forwarding packets based on each flow's match criteria, action, and priority. According to some aspects, entries in the flow tables 264 may be defined by the controller 210. For example, the controller can set up paths through the network optimized for specific characteristics, such as speed, fewest number of hops, or reduced latency.

The controller interface 275 may provide a secure channel through which the controller 210 can communicate with the switch 122 to, for example, program the flow table 264. The communications through the controller interface 275 may occur according to a particular protocol, such as the Open-Flow™ Protocol.

While the components of the switch 122 have been described with respect to a particular Tier 1 switch, it should be understood that a similar architecture may be imparted to any of the other switches in the network 100.

Returning to FIG. 1, when the switch 122 attempts to deliver the packets received from the switch 132 to the switch 111, it may be determined that the link 151 between the switch 122 and the switch 111 is down. For example, a cable coupling the switches 111, 122 may be disconnected from one of the switches 111, 122, damaged, or otherwise incapable of transmitting information. Alternatively or additionally, an interface or port on one of the switches 111, 122 may be down. The determination that the link 151 is down may be made by, for example, the switch 122 or the controller 210. Local software running in the switch 122 may remove the flow pointing to link 151 from the flow table, thereby allowing the lower priority fallback flow to perform the packet forwarding for this destination. In any case, the switch 122 may "backtrack" the packets out of the route including the failed link 151. For example, the switch 122 may attempt to reroute the packet via a peer switch, such as the switch 124 or 126, using any of the higher tier switches (e.g., switch 132, 134) to which the switch 122 is connected as an intermediate point in a fallback path. In the example of FIG. 1, fallback path 164 uses the higher tier switch 132 to reroute the packet to peer router 124.

Routing of the packets in this regard may be effected by programming a flow table of the switch 122. An example of such a flow table 364 is shown in FIG. 3. The flow table 364 may include a plurality of entries 370, 372, each entry having a flow rule including a key, an action, and a priority. The key may be a match criteria to be compared against information in a packet header. For example, the match criteria may include destination information for the packet. The flow has an action to be taken with respect to packets for a particular destination, such as a logical next hop (e.g., a next switch to receive the packet). The priority may dictate how a flow is handled if it matches multiple entries 370, 372 with respect to its key. For example, entry 370 includes a higher priority than the entry 372. Because a packet destined for the host 102 connected to the switch 111 would match both entries, the higher priority entry 370 may be used. If, however, it is determined that a link or switch is down along the higher priority route, the lower priority entry 372 may be used.

Returning to FIG. 1, the flow rules may be programmed by the controller 210 on the switch 122 such that a route including a local link, such as the link 151, has a higher priority over a backtrack or fallback route. When the link 151 is detected as down, the fallback path may be installed immediately until routing algorithms converge. This installation may be performed, for example, based on intelligence in local software running at the switch 122. Thus as long as the local link from the switch 122 to the switch 111 is up, the local link path 162 is chosen to forward traffic. If the local link 151 goes down, the flow (entry 370 of FIG. 3) for the local link path 162 may be removed from the flow table of the switch 122. For example, software running on the switch 122 may automatically remove the flow for the link path 162 from its flow table. Thus, any packets destined for the switch 111 may be reachable through a fallback path 164.

According to one example, when using this backtrack path, the packet may be encapsulated inside an outer packet using tunnel encapsulation. The outer packet's source address assumes a value of an IP address of the originator (e.g., the switch 122), and its destination address is a value for the tunnel's termination point (e.g., the switch 124). Accordingly, the encapsulated packet may be routed to peer switch 124 through one of the Tier 3 switches, such as the switch 132. The peer switch 124 may decapsulate the packet and forward the inner packet, for example, based on the inner packet's destination address or based on any policy routing rules configured on the switch 124. For example, the peer switch 124 can try to forward the inner packet to the switch 111 if it has links in active state.

In some instances, the peer switch along the fallback path may also have a failed link to the destination switch. In this case, the peer Tier 2 switch can further send the packet up to the Tier 3 switch 132 and out to the destination switch 111 via another peer Tier 2 switch, such as the switch 126, by following the same mechanism as described above. In this regard, backtracking can proceed in a chained manner.

Because some degree of latency is introduced each time the packet is backtracked, a lot of such backtracking may result in stale packets or packets that are out of order. Accordingly, a number of times the packet is backtracked may be restricted. To restrict how many times the packet is backtracked, the original switch which initiated the backtrack (e.g., switch 122) can set an upper bound on a number of times the packet is backtracked. For example, the upper bound may be set at three, so as to avoid any unnecessary looping in case of misconfiguration. The upper bound may be set as a value in the packet header field, such as a time-to-live (TTL) field. The number of times a packet is backtracked may be determined by, for example, tracking the number of times the packet is decapsulated at a Tier 2 switch. The determination that the upper bound has been reached may be made by the controller 210, the Tier 2 switch 122 that originally received the packet, the Tier 2 switch that receives the packet after the third backtrack, or any other network device. After the upper bound is reached the packet may be dropped.

As mentioned above, the backtracking may be performed using data tunnels between the Tier 2 switch 122 and any of the peer Tier 2 switches 124-128. For example, referring to FIG. 1, the backtrack path from the switch 122 to the switch 124 may be considered the data tunnel for the switch 122. These data tunnels may also serve as a load-balancing mechanism. For example, the tunnels may be set up such that the additional load of traffic during periods of route convergence does not fall disproportionately on one Tier 2 switch. For example, because the network 100 includes four Tier 2 switches 122-128, each switch may serve as a fallback for another switch, such as an adjacent switch. For example, the backtrack path for the switch 122 may be through the switch 124, the backtrack path for the switch 124 may be through the switch 126, and the backtrack path for the switch 126 may be through the switch 128.

Figure 4:
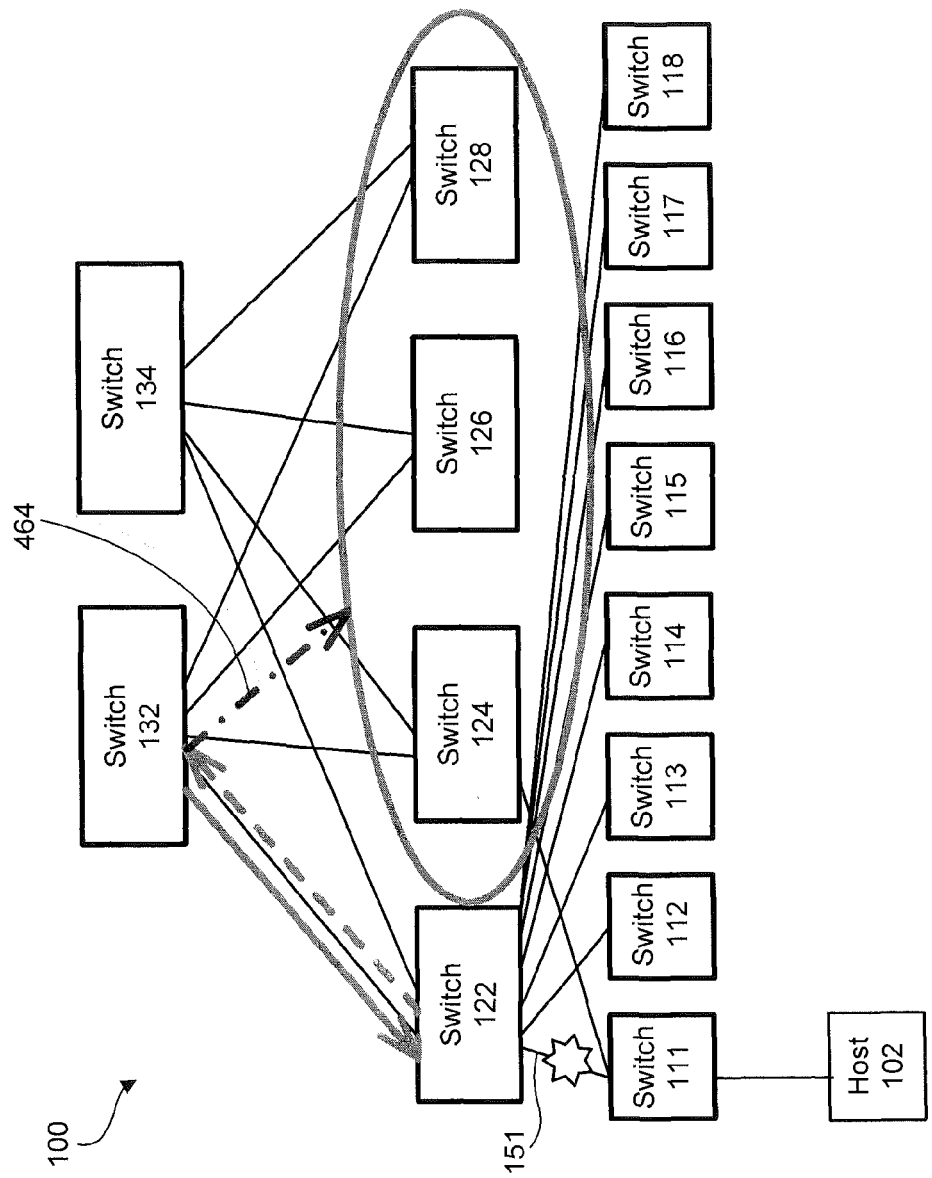
FIG. 4 is a schematic diagram of a multi-stage network illustrating options for flow distribution according to aspects of the disclosure.

According to another example, load balancing may be performed by distributing the backtracked packets across a set of peer Tier 2 switches. For example, as shown in FIG. 4, three switches 124, 126, 128 are available as fallback switches for the switch 122. Rather than burdening the switch 124 with all of the traffic destined for the switch 111 through the switch 122, this traffic may be distributed across the switches 124, 126, 128. For example, a fallback path 464 may include a logical next hop of one of the switches 124, 126, 128, and therefore a data tunnel from the switch 122 may terminate in any one of the switches 124, 126, 128. Such distribution may be effected by, for example, the controller 210. According to one example, this load-balancing can be done based on the original packet's characteristics, such as source/destination address, layer 4 port number, etc.

According to one example, the controller 210 may dynamically respond to topology changes in the network 100 and alter backtrack paths for a given Tier 2 switch based on a link state of its peer Tier 2 switches. For example, the controller 210 may have previously determined that for any link between a destination and the switch 122, the switch 124 will serve as the fallback switch. However, if a link between the destination and the switch 124 also goes down, the controller 210 may choose a different Tier 2 switch, such as the switch 126, as the fallback switch for the switch 122. For example, if a link between the switch 111 and the switch 124 fails, the switch 124 will notify the controller, which will update the fallback path programmed in the switch 122. For example, the controller may identify any alternate peer switch which still has an active link to the switch 111, such as the switch 126 or the switch 128, and may use those switches as the fallback for the switch 122.

Figure 5:
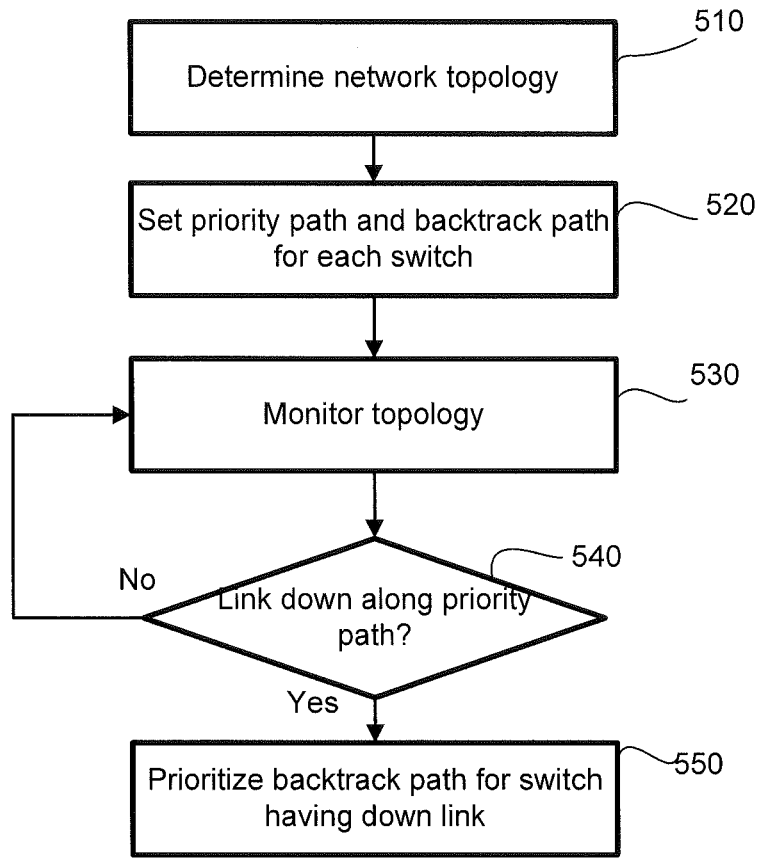
FIG. 5 is a flow diagram of an example method according to aspects of the disclosure.

FIG. 5 is a flow diagram illustrating a method 500 according to aspects of the disclosure. According to this method 500, a network topology is monitored and routing paths are updated accordingly as packets are routed through the network. The monitoring and updating may be performed, for example, by a controller, such as the controller 210. While the description below refers to a number of blocks of the method 500 in a particular order, it should be understood that the order in which the blocks are performed may be modified, and blocks may be added or omitted.

In block 510, a topology of the network may be determined. For example, it may be determined how many switches are in the network, a hierarchical arrangement of the switches (e.g., Tier 1, Tier 2, Tier 3), and how the switches in the hierarchy are linked to one another. For example, it may be determined that the network includes three tiers of switches, with x number of switches in the first tier, y number of switches in the second tier, and z number of switches in the third tier. Further to this example, it may also be determined that each switch in a given tier is linked to each switch in its adjacent tier.

In block 520, flows may be programmed for each switch. In particular, each switch may be programmed to include a priority path and a backtrack or fallback path. The priority path may be the path used to route packets through the network assuming all links along that path are intact. It may be, for example, the most direct or the most efficient route. The backtrack path, in contrast, may be used only when a link along the priority path is down. The backtrack path may route the packet back up to a higher tier switch, and down to a fallback switch in place of the switch having the failed link. The priority path and backtrack path may be programmed on a flow table of each switch and controlled by a controller.

In block 530, a topology of the network may be monitored. It may be determined whether a link along a priority path is down (block 540). If no such link is down, the network may be continually monitored and packets may be routed using the programmed priority path. However, if it is determined that a link along the priority path is down, the backtrack path for the down link may be prioritized (block 550).

Prioritizing the priority path in block 550 may be performed in any of a number of ways. For example, the priority path including the down link may be removed from the switches along that path. This may be performed, for example, by the switch having the failed link. Alternatively, a priority level assigned to the priority path and/or the backtrack path may be updated.

Upon being notified that the link along the priority path is down, the controller may update any other switches which use that link as a fallback path. For example, the controller may replace the fallback paths for those switches with alternate fallback paths having active links to the destination.

While the backtrack path has been described above with reference to a higher tier switch sending packets down to a host, it should be understood that the same concepts may be applied to upwards packet sending in a multi-stage network. For example, referring to FIG. 1, the switch 111 may attempt to send packets to the switch 122, but determines that the link 151 between the two switches in down. In this regard, the switch 111 may utilize an alternate path to any of the switches 124, 126, or 128.

Moreover, while the examples above refer to a three tier multi-stage network, the concepts described may be applied to any multi-stage network. For example, the foregoing techniques may easily be adapted for a multi-stage network having two, four, ten, one hundred, etc. tiers.

The techniques described above may be implemented during the route convergence period. Once the network is converged, the controller may be aware of any down links and update the flow table of each switch on the network accordingly. Thus, for example, being aware of the down link 151, the controller 210 may update the flow tables of the switches in the network 100 such that any packet destined to hosts 102 attached to the switch 111 are not forwarded to the switch 122 from any upper tier switches.

The above-described aspects of the technology may be advantageous in preventing packet loss during the convergence period. Because the controller can dynamically respond to topology changes, fallback paths may be initialized or updated immediately. Moreover, while compensating for a down network link, the aspects described above provide for load balancing, so that particular nodes of the network do not become overloaded.

Although the present disclosure makes reference to particular examples, it should be understood that these examples are merely illustrative of the principles and applications of the subject matter of the claims. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative examples. However, these and that other arrangements may be devised without departing from the spirit and scope of the subject matter defined by the appended claims.

The invention claimed is:

1. A multi-stage network, comprising:
    a first stage comprising a first plurality of switches;
    a second stage comprising a second plurality of switches;
    a number of links between the first plurality of switches and the second plurality of switches; and
    a controller in communication with the first plurality of switches and the second plurality of switches, the controller predetermining for each of the second plurality of switches a priority path to be utilized in sending information and a fallback path;
    wherein, if a given switch along the priority path includes a failed link, the controller is configured to implement in the given switch the fallback path for sending the information; and
    wherein the given switch is configured to impose an upper bound on a number of times any fallback path is used for sending the information.

2. The multi-stage network of claim 1, wherein if the given switch is one of the second plurality of switches, the fallback path from the given switch leads to a peer switch in the second plurality of switches.

3. The multi-stage network of claim 2, further comprising:
    a third stage comprising a third plurality of switches;
    wherein the fallback path from the given switch to the peer switch routes through one of the third plurality of switches.

4. The multi-stage network of claim 2, wherein if the peer second stage switch includes a failed link, the controller is further configured to implement a second fallback path in the peer switch.

5. The multi-stage network of claim 1, wherein in implementing the fallback path the controller performs load balancing.

6. The multi-stage network of claim 1, wherein:
    at least the given switch includes a flow table;
    the controller programs the flow table to include the priority path and the fallback path; and
    the priority path has priority over the fallback path.

7. The network of claim 6, wherein in implementing the fallback path, the priority path is removed from the flow table.

8. A method for routing information through a multi-stage network including a first stage comprising a first plurality of switches, a second stage comprising a second plurality of switches, and a number of links between the first plurality of switches and the second plurality of switches, the method comprising:
    predetermining for at least one of the second plurality of switches a priority path to be utilized in sending information;
    predetermining for the at least one of the second plurality of switches a fallback path;
    determining whether a link along the priority path is down;
    if the link along the priority path is down, implementing the fallback path for sending the information; and
    imposing an upper bound on a number of times any fallback path is used for sending the information.

9. The method of claim 8, wherein implementing the fallback path comprises rerouting the information to a peer switch in the second plurality of switches.

10. The method of claim 9, wherein implementing the fallback path comprises rerouting the information through another switch in a higher stage of the network.

11. The method of claim 8, wherein implementing the fallback path comprises removing the priority flow from a flow table in the at least one of the second plurality of switches.

12. A network switch, comprising:
- a flow table, the flow table including a priority flow and a fallback flow, each of the priority flow and the fallback flow indicating a logical next hop for information matching a corresponding key;
- a processor; and
- a memory in communication with the processor, the memory storing instructions executable by the processor to:
  - send information through the network using the priority flow;
  - determine whether a link to the logical next hop in the priority flow is down;
  - if the link to the logical next hop in the priority flow is down, reconfigure the flow table to send the information through the network using the fallback flow; and
  - set an upper boundary on a number of times the information is sent through the network using fallback flows.

13. The switch of claim 12, wherein the logical next hop in the fallback flow is another network switch in a same tier of the network.

14. The switch of claim 12, wherein the memory further comprises instructions to encapsulate the information sent through the network using the fallback flow.

15. The switch of claim 12, wherein the memory further comprises instructions to:
- receive second information, wherein the second information has been encapsulated by another network switch;
- decapsulate the second information; and
- forward the second information towards its destination based on the flow table.

16. The switch of claim 15, wherein the memory further comprises instructions to:
- determine a number of times the second information has been decapsulated by any switch in the network;
- identify an upper boundary that has been set on the number of time the second information can be decapsulated; and
- discard the packet in response to determining that the determined number of times the second information has been decapsulated equals the upper boundary.

* * * * *